Figure 3:
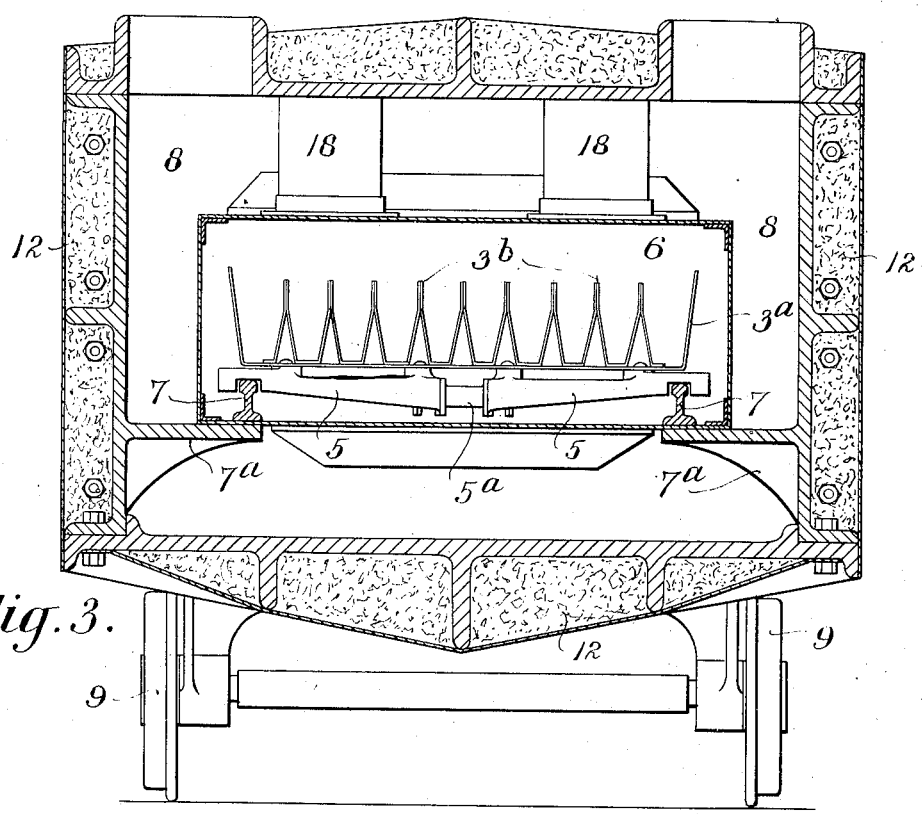

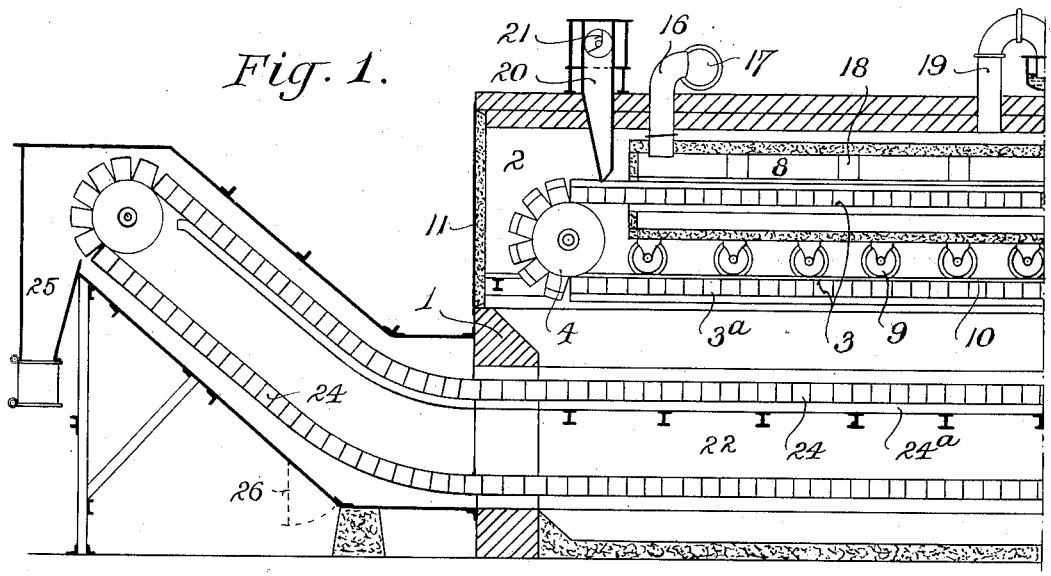
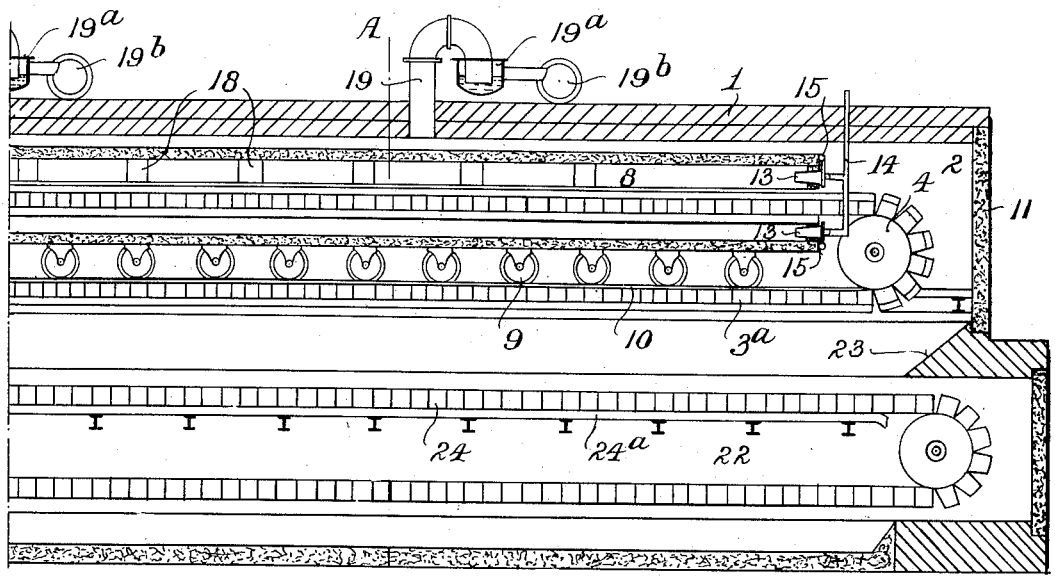

UNITED STATES PATENT OFFICE.

RICHARD SLOANE RICHARDS, OF WRAYSBURY, AND ROBERT WILLIAM PRINGLE, OF RICHMOND, ENGLAND.

APPARATUS FOR THE DISTILLATION OF COAL AND THE RECOVERY OF THE PRODUCTS.

974,919.   Specification of Letters Patent.   Patented Nov. 8, 1910.

Application filed June 10, 1910. Serial No. 566,201.

*To all whom it may concern:*

Be it known that we, RICHARD SLOANE RICHARDS, engineer, of Bowery House, Wraysbury, Buckinghamshire, England, and ROBERT WILLIAM PRINGLE, engineer, of 25 Ellerker Gardens, Richmond, Surrey, England, have invented certain new and useful Improvements in Apparatus for the Distillation of Coal and the Recovery of the Products, of which the following is a specification.

This invention consists in improved apparatus for the distillation of coal and the recovery of the products, and its object is to provide apparatus whereby this may be effected automatically and continuously, and whereby disadvantages previously experienced may be avoided.

According to this invention we employ in a form of muffle furnace, horizontal or inclined, an endless conveyer, which consists of a continuous series of trays open-ended or otherwise, attached to a chain or chains forming an endless band or like device. This endless conveyer is caused to travel slowly by mechanical means. The upper stretch of the conveyer passes through a distilling chamber closely enveloping the band, which chamber is enveloped on all sides by a heating flue of flues or is sandwiched between upper and lower heating flues, the arrangement being such that the upper stretch of the conveyer travels slowly through the distilling chamber surrounded by or sandwiched between flues while on the return journey the conveyer does not pass through the distilling chamber. The whole apparatus at the same time being inclosed for the purpose of excluding air. The coal while it is on the conveyer is thus heated efficiently as it travels through the distilling chamber, between or within the said flue or flues, hereinafter called the enveloping flue or flues; the band on the other hand is only subjected to the high temperature of the flue while passing through the distilling chamber.

The traveling bands or conveyers are formed with open trays, or molds or boxes open on one side, or molds or boxes automatically closed after having been filled, sufficient apertures being provided for the escape of the gases or other by-products.

The distilling chamber may be constructed of any suitable material, but it is preferably of boiler plate or other good conductor. The coal is fed in a layer to the upper stretch of the conveyer at one end and the residual product is discharged at the other end.

The distilling chamber may be provided with a series of plates or webs attached to its wall or walls and extending to within a short distance of the coal or conveyer or the bottom of the trays, so as to conduct and distribute the heat to the coal thereon, or the pans may be provided with longitudinal partitions to effect the same object.

A number of endless conveyers may be arranged in relation with a plurality of flues as described, and be superimposed so that the coal can be fed simultaneously to the upper stretch of each conveyer by a separate hopper or chute, or the arrangement may be such that the product discharged from one conveyer falling on to the upper stretch of that beneath is carried through the distilling chamber thereof, and so on throughout the series or as required.

The distilling chamber or chambers is or are heated by producer gas or other gaseous or liquid fuel or the products of combustion of solid fuel, burned in the enveloping flue or in flues connected therewith. Gas obtained from the distillation may be used for this purpose. Each distilling chamber may be disposed between upper and lower flues, which extend also around the sides of the distilling chamber, and the heating gas may be introduced into the heating flue or flues from a combustion chamber at the side of the furnace, or the flue itself may form the combustion chamber.

Ascension pipes leading to a hydraulic main will usually be arranged for collecting the volatile products from the distilling chamber or chambers.

The coal is fed to the conveyer or conveyers by a hopper or hoppers, the feed from which may be regulated by a revolving drum or other suitable device arranged so as to secure an air seal.

The apparatus preferably comprises a cooling chamber containing a traveling band, on to which the product is discharged from the conveyer or conveyers and whereon it is cooled to a suitable temperature before it is allowed to come into contact with the air. By this means also the necessity for quenching with steam or water may be dispensed with and the heat of the cooling product utilized. With the latter object the cooling band might be inclosed in a sheet iron or other chamber provided with radiators so arranged that the product would lose its heat as rapidly as possible, and the cooling chamber might be combined with flues through which the air or the gas for the heating of the furnace may pass so as to regenerate the air or gas by the heat of the cooling product.

The cooling band may deliver the product direct or by an elevator to storage hoppers in which it is further cooled. The hopper or hoppers which feed the conveyer or conveyers and also the cooling band and elevator should be closed so that air cannot enter the apparatus. In any case care must be taken to exclude air from the distilling chamber or chambers.

We may construct the enveloping flue or flues of metal preferably cased with slag wool or other non-conductor, so as to concentrate the heat of the flue or flues upon the distilling chamber within or between the same and to reduce radiation of the heat from the outer sides of the flue.

According to a particular form of the invention we also construct the enveloping flue or flues in such a manner as to be independent of the masonry of the furnace, so that the said flue or flues are free to expand and contract with varying temperature. With this object we make the enveloping flue or flues, together with the distilling chamber, as a separate structure. The structure may be supported upon rollers in such a way that it can be run bodily out of the furnace, together with the distilling chamber, for repairs or other purposes.

It will be understood that in cases where a number of endless conveyers are employed in one furnace the enveloping flue or flues of each distilling chamber may be constructed and arranged in the manner just described.

The manner in which the invention can be carried into effect will be understood from the following description of an example of apparatus constructed in accordance therewith; reference is to be had to the accompanying drawings in which,—

Figure 2:
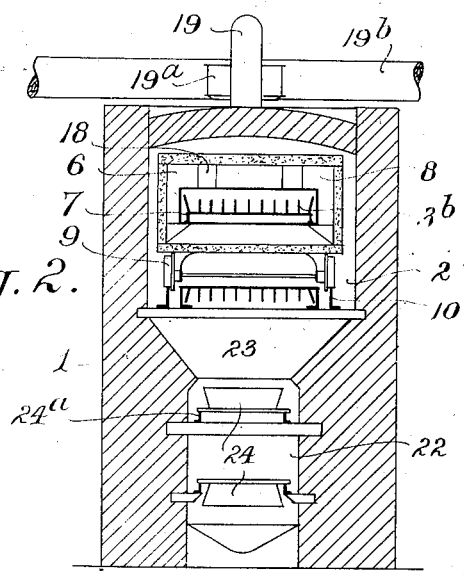

Figures 1, 1ª are a diagrammatic longitudinal section of the apparatus; Fig. 2 a cross section on A—A, Fig. 1ª, and Fig. 3 a cross section on a larger scale through the self-contained retort formed by the distilling chamber and its heating flues.

1 represents a structure of masonry in the upper chamber 2 of which is mounted an endless conveyer 3 consisting of open-ended and open topped trays 3ª overlapping each other at the ends and preferably divided into a transverse series of channel-shaped compartments as shown by webs or plates 3ᵇ serving to sub-divide the charge and distribute the heat through same. The trays are carried by a chain or chains passing around chain wheels 4, 4 and the links 5ª of the chain have lateral supporting arms 5 for the trays. The upper stretch of the conveyer passes through to the distilling chamber 6 which has rails 7 on which the arms 5 travel and the under stretch of the conveyer returns outside the distilling chamber 6. This latter is enveloped by a heating flue 8 which, together with the distilling chamber 6, forms a separate and independent structure or self-contained retort mounted on wheels 9 and capable of being run into and out of the upper chamber 2 upon rails 10, the ends of this chamber being provided for the purpose with doors or covers 11 lined with refractory material. The distilling chamber 6 and heating flue 8 are constructed of boiler plate and the outer walls of the heating flue are all lined with refractory material 12. The rails 7 for supporting the endless conveyer are supported on corbels 7ª disposed at intervals in the flue 8. The distilling chamber 6 is heated by producer or other gas burned in the enveloping flue 8 and admitted to burners 13 at the far end of the flue 8 by a pipe or pipes 14 the necessary air being supplied by a pipe or pipes 15. With this arrangement the material traveling through the distilling chamber is subjected to a progressively increasing temperature as it proceeds. The waste heating gases pass away from the end of the flue 8 by a pipe 16 to a waste heat main 17 and can be utilized for generating steam for the gas producer from which the burners 13 are supplied, or for any other purpose. Pipes 18 open at intervals into the distilling chamber and through the top of the enveloping flue 8 for the escape of the distillation products, which are led away by rising pipes 19 from the top of the chamber 2 to hydraulic mains 19ª connected to foul mains 19ᵇ.

The coal is fed continuously to the trays of the conveyer 3, by a hopper 20, and the feed is regulated by a revolving drum 21 arranged to prevent the access of air to the chamber 2. The coal is supplied to the drum 21 by a screw conveyer or other means.

The endless conveyer is driven by any suitable means so as to carry the coal slowly through the distilling chamber.

The upper chamber 2 communicates with a lower cooling chamber 22 by a hopper like passage 23 which may extend for the whole length of the upper chamber.

24 is an endless cooling band formed of open ended and open topped trays mounted on chains or otherwise and supported in its travel on rails 24ª. The material discharges from the endless conveyer 3 at the delivery end thereof drops into the trays of the cooling conveyer 24 which carries it slowly through the cooling chamber and delivers it through a double door discharge outlet 25 into trucks or otherwise.

26 is a door for giving access to the cooling conveyer 24. The entire structure must be carefully shut off from the air.

In apparatus constructed as illustrated it will be seen that the muffle furnace proper is constituted by the self-contained retort structure.

A number of self-contained retorts, each with an endless conveyer traveling through its distilling chamber, may be arranged side by side in one outer chamber or furnace if desired, and the endless cooling conveyer may be arranged to run transversely to the distilling conveyers at their discharge end, so as to receive the product from some or all of them.

It will be understood generally that the apparatus can be constructed in various ways without departing from the spirit of the invention.

What we claim and desire to secure by Letters Patent is:—

1. Apparatus for the partial carbonization and distillation of coal, comprising in combination a distilling chamber, a heating flue system enveloping the same, an endless conveyer whereof the upper stretch is closely enveloped by and adapted to travel through said distilling chamber and whereof the lower stretch is outside said heating flue system, means for imparting traveling motion to the conveyer, means for supplying coal to the upper stretch of the conveyer and an inclosing structure for the apparatus adapted to exclude the air substantially as described.

2. Apparatus for the partial carbonization and distillation of coal, comprising in combination a distilling chamber, a heating flue system enveloping the same, an endless conveyer whereof the upper stretch is closely enveloped by and adapted to travel through said distilling chamber and whereof the lower stretch is outside said heating flue system, means for imparting traveling motion to the conveyer, means for supplying coal to the upper stretch of the conveyer, an inclosing structure adapted to exclude the air, and means for carrying away and collecting the gaseous distillation products evolved, substantially as described.

3. Apparatus for the partial carbonization and distillation of coal, comprising in combination a distilling chamber, a heating flue system enveloping the same, an endless conveyer whereof the upper stretch is closely enveloped by and adapted to travel through said distilling chamber and whereof the lower stretch is outside said heating flue system, means for imparting traveling motion to the conveyer, means for supplying coal to the upper stretch of the conveyer, and an inclosing structure for the apparatus adapted to exclude the air, said distilling chamber and its heating flue system being an independent metal structure adapted to be run into and out of the inclosing structure, substantially as described.

4. Apparatus for the partial carbonization and distillation of coal, comprising in combination a distilling chamber, a heating flue system enveloping the same, an endless conveyer whereof the upper stretch is closely enveloped by and adapted to travel through said distilling chamber and whereof the lower stretch is outside said heating flue system, means for imparting traveling motion to the conveyer, means for supplying coal to the upper stretch of the conveyer, and an inclosing structure for the apparatus adapted to exclude the air, said distilling chamber and its heating flue system being an independent metal structure lined with refractory material, adapted to be run into and out of the inclosing structure, substantially as described.

5. Apparatus for the partial carbonization and distillation of coal, comprising in combination a distilling chamber, a heating flue system enveloping the same, an endless conveyer whereof the upper stretch is closely enveloped by and adapted to travel through said distilling chamber and whereof the lower stretch is outside said heating flue system, said conveyer consisting of open trays, means for imparting traveling motion to the conveyer, means for supplying coal to the upper stretch of the conveyer, and an inclosing structure for the apparatus adapted to exclude the air, substantially as described.

6. Apparatus for the partial carbonization and distillation of coal, comprising in combination a distilling chamber, a heating flue system enveloping the same, an endless conveyer whereof the upper stretch is closely enveloped by and adapted to travel through said distilling chamber and whereof the lower stretch is outside said heating flue system, said conveyer consisting of open-ended trays of channel section adapted to overlap each other at the ends, means for imparting traveling motion to the conveyer, means for supplying coal to the upper stretch of the conveyer, and an inclosing structure for the apparatus adapted to exclude the air, substantially as described.

7. Apparatus for the partial carbonization and distillation of coal, comprising in combination a distilling chamber, a heating flue system enveloping the same, an endless conveyer whereof the upper stretch is closely enveloped by and adapted to travel through said distilling chamber and whereof the lower stretch is outside said heating flue system, means for imparting traveling motion to the conveyer, means for supplying coal to the upper stretch of the conveyer, metal heat distributers adapted to extend into the charge on the conveyer in the distilling chamber and an inclosing structure for the apparatus adapted to exclude the air substantially as described.

8. Apparatus for the partial carbonization and distillation of coal, comprising in combination a distilling chamber, a heating flue system enveloping the same, an endless conveyer whereof the upper stretch is closely enveloped by and adapted to travel through said distilling chamber and whereof the lower stretch is outside said heating flue system, said conveyer consisting of open trays having longitudinal metal walls adapted to subdivide the charge and distribute the heat therein, means for imparting traveling motion to the conveyer, means for supplying coal to the upper stretch of the conveyer and an inclosing structure for the apparatus adapted to exclude the air, substantially as described.

9. Apparatus for the partial carbonization and distillation of coal, comprising in combination a distilling chamber, a heating flue system enveloping the same, an endless conveyer whereof the upper stretch is closely enveloped by and adapted to travel through said distilling chamber and whereof the lower stretch is outside said heating flue system, said conveyer consisting of open ended trays of channel section adapted to overlap each other at the ends, a chain on which said trays are mounted, supporting arms on the chain links for said trays, rails in the distilling chamber whereon said supporting arms are adapted to travel, means for imparting traveling motion to the conveyer, means for supplying coal to the upper stretch of the conveyer, and an inclosing structure for the apparatus adapted to exclude the air, substantially as described.

10. Apparatus for the partial carbonization and distillation of coal, comprising in combination a distilling chamber, a heating flue system enveloping the same, an endless conveyer whereof the upper stretch is closely enveloped by and adapted to travel through said distilling chamber and whereof the lower stretch is outside said heating flue system, means for imparting traveling motion to the conveyer, means for supplying coal to the upper stretch of the conveyer, an endless cooling band adapted to receive the product discharged from the distilling conveyer, a cooling chamber, means for traveling said cooling band slowly through the cooling chamber, and an inclosing structure for the apparatus adapted to exclude the air substantially as described.

In witness whereof, we have hereunto signed our names in the presence of two subscribing witnesses.

RICHARD SLOANE RICHARDS.
ROBERT WILLIAM PRINGLE.

Witnesses:
SIDNEY HABERT DONALDSON,
ROBERT MILTON SPEARPOINT.